(12) United States Patent
Livni et al.

(10) Patent No.: US 6,913,071 B1
(45) Date of Patent: Jul. 5, 2005

(54) BALL TRAP WITH SAFETY-RELEASE GATE

(75) Inventors: Omer Livni, Hod Hasharon (IL); Motti Karin, Hod Hasharon (IL); Zvi Livni, Tel Aviv (IL)

(73) Assignee: C.Q.M. Ltd., Tirat Yehuda (IL)

( * ) Notice: Subject to any disclaimer, the term of this patent is extended or adjusted under 35 U.S.C. 154(b) by 75 days.

(21) Appl. No.: 10/836,220

(22) Filed: May 3, 2004

(51) Int. Cl.$^7$ ................................................. B08B 9/00
(52) U.S. Cl. ........................................ 165/95; 15/3.51
(58) Field of Search ................... 165/95, 119; 15/3.51, 15/3.5, 104.05, 104.61, 104.62; 134/8, 10

(56) References Cited

U.S. PATENT DOCUMENTS

| | | | |
|---|---|---|---|
| 4,234,993 A | * | 11/1980 | Kintner ................. 15/104.062 |
| 4,385,660 A | * | 5/1983 | Koller .......................... 165/95 |
| 4,539,115 A | | 9/1985 | Patzig |
| 4,566,533 A | * | 1/1986 | Bochinski et al. ............ 165/95 |
| 4,620,589 A | | 11/1986 | Koller |
| 5,010,950 A | | 4/1991 | Voith |
| 5,086,833 A | * | 2/1992 | Ben-Dosa .................... 165/95 |
| 5,450,895 A | | 9/1995 | Peery |
| 5,598,889 A | * | 2/1997 | Jackson ....................... 165/95 |
| 5,630,471 A | * | 5/1997 | Taprogge ..................... 165/95 |
| 6,609,559 B2 | * | 8/2003 | Jackson ....................... 165/95 |

FOREIGN PATENT DOCUMENTS

| | | | |
|---|---|---|---|
| DE | 3411461 | 10/1985 | ........... F16L 55/24 |
| JP | 11230694 A | * 8/1999 | ............. F28G 1/12 |

* cited by examiner

Primary Examiner—Tho v Duong
(74) Attorney, Agent, or Firm—Mark M. Friedman

(57) ABSTRACT

The ball trap of the present invention is configured for connection in a pipeline such that the main flow path of the fluid in the pipeline passes through the ball trap. The ball trap includes a sieve conduit with a safety-release sieve gate. The sieve gate is displaceable between a closed position, in which cleaning balls are trapped in the ball trap, and an open position, in which the impedance of the fluid flowing in the pipeline is lowered. The system is configured such that the gate is normally in the closed position and may be displaced to the open position for cleaning purposes or in response to a predetermined pressure differential between the upstream and downstream sides of the sieve conduit.

26 Claims, 9 Drawing Sheets

BALL TRAP WITH SAFETY-RELEASE GATE

FIELD AND BACKGROUND OF THE INVENTION

The present invention relates to systems using cleaning bodies, generally sponge balls, for cleaning the pipes of heat-exchangers and, in particular, it concerns a ball trap for removing the cleaning bodies from the main fluid flow path of the system, such ball trap having a safety-release sieve gate.

It is known to introduce into water about to pass through a heat exchanger cleaning bodies whose function it is to wipe clean the heat exchange surfaces of the condenser.

When cleaning is accomplished by the use of such cleaning bodies, they must be captured, or recovered, from the water downstream of the heat exchanger. After such capture, the cleaning bodies are recirculated to a location upstream of the condenser to be re-introduced in to the cooling water. Hereinafter, the cleaning bodies are referred to as cleaning balls, the composition of which is not the concern of the application.

It is known to provide a ball trap that includes a grate, screen, sieve or grid, hereinafter referred to as a sieve, with a bar spacing less than the diameter of the balls, in the path of the water downstream of the condenser to recover the cleaning balls. Also included is a means by which the captured balls are removed from the downstream pipe so as to be collected and thereafter re-introduced upstream as necessary.

Various ball trap formations have been suggested. Generally, the ball traps of the prior art include sieves deployed solely within the diameter of the pipeline. The sieve is usually deployed at an angle to the direction of the fluid flow path such that the cleaning balls are forced along the face of the sieve to a collection point from which the cleaning balls are removed form the downstream pipe. Representative of these ball traps are U.S. Pat. No. 5,010,950 to Voith, U.S. Pat. No. 4,620,589 to Koller, U.S. Pat. No. 4,539,115 to Patzig, and German Patent No 3,411,461 to Grewe.

An issue confronted by the ball traps of prior art is that of micro or biological foulant build-up on the sieve. This can restrict the flow of cooling fluid through the sieve and cause increased pressure of the upstream side of the sieve. Some systems of the prior art monitor the pressure on both sides of the sieve and when the differential pressure reaches a preset limit, the sieve is displaced, usually rotated, so as to open the pipeline to unrestricted flow. Such displacement may be in response to an emergency situation or to perform a backwash so as to clear the foulant from the sieve.

Since the sieve is deployed within the pipeline, the surface area of the sieve is limited by the diameter of the pipe and the deployment angle of the sieve within the pipe. Generally, the sieves of prior art are elliptical or partially elliptical having surface areas of not more than about 200–250 percent of the cross-sectional area of the pipeline.

An alternative to the ball traps of prior art is offered in U.S. Pat. No. 5,450,895 to the present assignee. U.S. Pat. No. 5,450,895 discloses a ball trap with a sieve "tube" deployed within a portion of the main pipeline and extending out of the main flow path of the cooling fluid. The sieve of U.S. Pat. No. 5,450,895 provides a larger sieve surface area. U.S. Pat. No. 5,450,895 relates to systems having relatively small pipeline diameter such as many common industrial applications, but is unsuitable for high flow rate systems having large diameter pipeline, such as power station cooling system, because it lacks the pressure release feature required in such systems.

There is therefore a need for a ball trap with a sieve having a surface area greater than or equal to 300 percent of the cross-sectional area of the pipeline, the sieve including a safety-release sieve gate, which when open allows unrestricted flow of cooling fluid.

SUMMARY OF THE INVENTION

The present invention is a ball trap having a safety-release sieve gate.

According to the teachings of the present invention there is provided, a ball trap for separating a plurality of cleaning balls from a fluid within which they are carried through at least part of a pipeline, the ball trap comprising: (a) a cylindrical pipe section provided with upstream and downstream openings for interconnection with the pipeline such that a main fluid flow path of the pipeline passes through the upstream and the downstream openings; (b) a trap section interconnected to, and having a length extending at an angle from, the cylindrical pipe section, the interconnection providing fluid communication between the cylindrical pipe section and the trap section, the trap section including a cleaning ball outlet; (c) a sieve conduit having a portion extending substantially lengthwise within the trap section, the sieve conduit connecting between the upstream opening and the cleaning ball outlet for trapping the plurality of cleaning balls therein as fluid continually flows from the upstream opening to the downstream opening, the sieve conduit having a safety-release opening positioned for substantially straight-through flow from the upstream opening to the downstream opening, the sieve conduit configured so as to provide a fluid flow region between at least one wall of the sieve conduit and at least one wall of the trap section so as to provide a fluid return path to the downstream opening; and (d) a displaceable sieve gate configured in the sieve conduit, the sieve gate displaceable between a closed position in which the sieve gate closes the safety-release opening to passage of the cleaning balls such that the plurality of cleaning balls are trapped within the sieve conduit and generally directed toward the cleaning ball outlet, and an open position in which the safety-release opening is at least partially opened such that the impedance of the fluid flow in the pipeline is lowered.

According to a further teaching of the present invention, the sieve conduit has a surface area greater than 300% of a cross-sectional area of the pipeline.

According to a further teaching of the present invention, the trap section is configured as a cylindrical trap section.

According to a further teaching of the present invention, the portion of the sieve conduit extending along a length of the trap section is configured as a generally cylindrical sieve conduit portion.

According to a further teaching of the present invention, the sieve conduit is configured so as to extend from the upstream opening in a first direction through at least a portion of the cylindrical pipe section, and extends in a second direction through at least a portion of the trap section.

According to a further teaching of the present invention, the displaceable sieve gate is configured in a portion of the sieve extending through the cylindrical pipe section.

According to a further teaching of the present invention, the displaceable sieve gate is configured in a downstream end of the portion of the sieve extending through the cylindrical pipe section.

According to a further teaching of the present invention, the displaceable sieve gate is rotationally displaceable about an axis that passes through a center point of the pipeline.

According to a further teaching of the present invention, the axis is substantially perpendicular to both a direction of the main fluid flow path and a length of the trap section.

According to a further teaching of the present invention, the displaceable sieve gate is linearly displaceable.

According to a further teaching of the present invention, there is also provided, a sieve gate displacement mechanism configured to selectively displace the sieve gate between the closed position and the open position.

According to a further teaching of the present invention, the sieve gate displacement mechanism is configured so as to displace the sieve gate automatically in response to a predetermined pressure differential between upstream and downstream sides of the sieve.

According to a further teaching of the present invention, the sieve gate displacement mechanism is configured so as to displace the sieve gate into a backwash deployment such that fluid flowing in the direction of the main fluid flow path passes through the sieve gate in a substantially reverse direction.

There is also provided according to the teachings of the present invention, a method for separating a plurality of cleaning balls circulating in a fluid through a pipeline, the method comprising: (a) providing a cylindrical pipe section provided with upstream and downstream openings for interconnection with the pipeline such that a main fluid flow path of the pipeline passes through the upstream and the downstream openings; (b) providing a trap section interconnected to, and having a length extending at an angle from, the cylindrical pipe section, the interconnection providing fluid communication between the cylindrical pipe section and the trap section, the trap section including a cleaning ball outlet; (c) providing a sieve conduit having a portion extending substantially lengthwise within the trap section, the sieve conduit connecting between the upstream opening and the cleaning ball outlet for trapping the plurality of cleaning balls therein as fluid continually flows from the upstream opening to the downstream opening, the sieve conduit having a safety-release opening positioned for substantially straight-through flow from the upstream opening to the downstream opening, the sieve conduit configured so as to provide a fluid flow region between at least one wall of the sieve conduit and at least one wall of the trap section so as to provide a fluid return path to the downstream opening; (d) providing a displaceable sieve gate configured in the sieve conduit, the sieve gate displaceable between a closed position in which the sieve gate closes the safety-release opening to passage of the cleaning balls such that the plurality of cleaning balls are trapped within the sieve conduit and generally directed toward the cleaning ball outlet, and an open position in which the safety-release opening is at least partially opened such that the impedance of the fluid flow in the pipeline is lowered; and (e) trapping the plurality of cleaning balls in the sieve conduit as fluid continually flows from the upstream opening to the downstream opening.

According to a further teaching of the present invention, the sieve conduit is implemented with a surface area greater than 300% of a cross-sectional area of the pipeline.

According to a further teaching of the present invention, the trap section is implemented as a cylindrical trap section.

According to a further teaching of the present invention, the portion of the sieve conduit extending along a length of the trap section is implemented as a generally cylindrical sieve conduit portion.

According to a further teaching of the present invention, the sieve is implemented so as to extend from the upstream opening in a first direction through at least a portion of the cylindrical pipe section, and extends in a second direction through at least a portion of the trap section.

According to a further teaching of the present invention, the displaceable sieve gate is implemented in a portion of the sieve extending through the cylindrical pipe section.

According to a further teaching of the present invention, the displaceable sieve gate is implemented in a downstream end of the portion of the sieve extending through the cylindrical pipe section.

According to a further teaching of the present invention, the displaceable sieve gate is implemented so as to be displaceable about an axis that passes through a center point of the pipeline.

According to a further teaching of the present invention, the axis is implemented so as to be substantially perpendicular to both a direction of the main fluid flow path and a length of the trap section.

According to a further teaching of the present invention, the displaceable sieve gate is implemented so as to be linearly displaceable.

According to a further teaching of the present invention, there is also provided, displacing the sieve gate between the closed position and the open position by use of a sieve gate displacement mechanism.

According to a further teaching of the present invention, the sieve gate displacement mechanism is implemented so as to displace the sieve gate automatically in response to a predetermined pressure differential between upstream and downstream sides of the sieve.

According to a further teaching of the present invention, the sieve gate displacement mechanism is implemented so as to displace the sieve gate into a backwash deployment such that fluid flowing in the direction of the main fluid flow path passes through the sieve gate in a substantially reverse direction.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
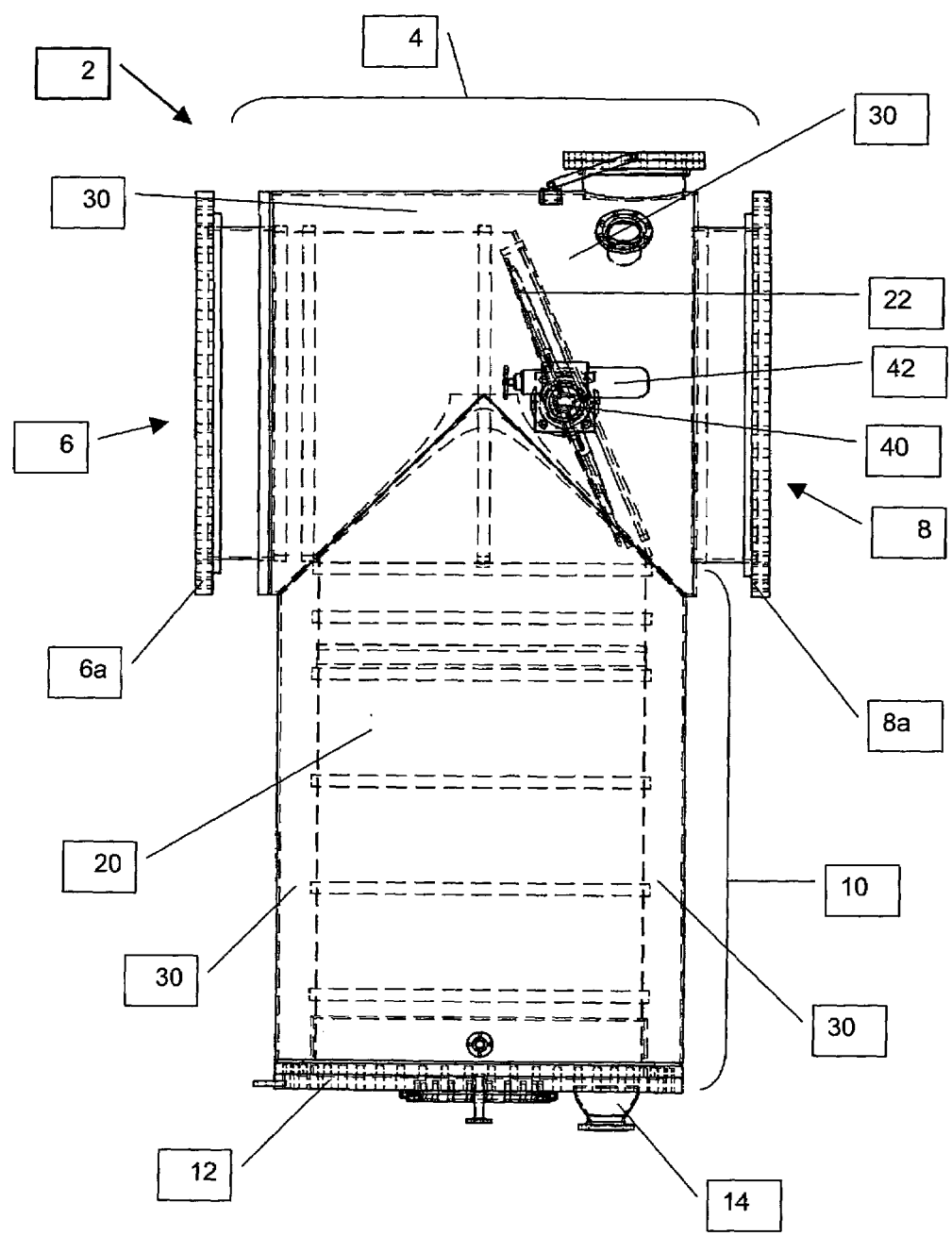
FIG. 1 is a schematic side view of a first preferred embodiment of a ball trap constructed and operative according to the teachings of the present invention showing a rotatable sieve gate in a closed position.

The present invention is a ball trap having a safety-release sieve gate.

The principles and operation of a ball trap having a safety-release sieve gate according to the present invention may be better understood with reference to the drawings and the accompanying description.

By way of introduction, the ball trap of the present invention is configured for connection in a pipeline such that the main flow path of the fluid in the pipeline passes through the ball trap. Although the ball trap of the present invention may be used beneficially as part of substantially any known system for cleaning the inside of tubing through which cleaning balls are circulated, it may be implemented in a manner analogous to the corresponding features described in the cleaning system of U.S. Pat. No. 5,450,895 to the present assignee. The ball trap includes a sieve conduit with a safety-release sieve gate that is displaceable between a closed position, in which cleaning balls are trapped in the ball trap, and an open position, in which the impedance of the fluid flowing in the pipeline is lowered. The system is configured such that the gate is normally in the closed position and may be displaced to the open position for cleaning purposes or in response to safety needs of the system, such as, by non-limiting example, a predetermined pressure differential between the upstream and downstream sides of the sieve conduit, thereby providing an emergency pressure release feature.

Two preferred embodiments of the ball trap of the present invention will be discussed herein. In a first preferred embodiment, FIGS. 1–6, the sieve gate rotates about an axis that is perpendicular to the main fluid flow path of the pipeline. In a second preferred embodiment, FIGS. 7–9, the sieve gate slides linearly along tracks configured on the side of the sieve.

With regard to both preferred embodiments of the present invention described herein, the sieve conduit is configured as a substantially cylindrical sieve deployed within two interconnected pipe sections. A first pipe section having upstream and downstream openings connected to the pipeline such that the main fluid flow of the pipeline flows through the ball trap from the upstream opening to the downstream opening, and a second section of pipe, referred to herein as the "trap section", extending at an angle from the first section of pipe. While the preferred angle between the first pipe section and the trap section illustrated herein is 90°, the trap section may be configured so as to extend from the first pipe section at substantially any angle. The sieve conduit is deployed within the first pipe section and the trap section extending lengthwise between the upstream opening in the first pipe section and a cleaning ball outlet configured in the trap pipe section such that the cylindrical wall of the sieve is spaced from the cylindrical wall of the pipe. The distance between the sieve and the cylindrical wall of the pipe differs based on the pipe-line diameter and is calculated so as not to restrict the fluid flow through the ball trap. The cleaning ball outlet may be associated with a value as described in relation to the ball separator of U.S. Pat. No. 5,450,895. Alternatively, the cleaning ball outlet may be configured to allow a constant flow of fluid and cleaning balls out of the ball trap through the ball cleaning outlet. In such a configuration, the fluid flowing through the upstream opening enters the inside of the sieve conduit, the main flow path of the fluid passes directly through the sieve, preferably through the sieve gate, and exits the ball trap through the downstream opening. The fluid is free to pass through the porous areas of the entire sieve conduit into the region between the sieve conduit and the walls of the first pipe section and the trap section, thereby reducing any impedance to the fluid flow caused by the presence of the sieve in the main flow path of the fluid. It should be noted that while it is preferable for the two pipe sections of the ball trap, that is the first pipe section and the trap section, to be of equal diameter, however, this need not always be the case, and a ball trap configured with the first pipe section and the trap section being of unequal diameters is within the scope of the present invention. Further, although the discussion and Figures herein refer to both the first pipe section and the trap section as being substantially cylindrical, this is intended as a non-limiting example of preferred embodiments of the present invention. It will be appreciated that the trap section and at least portions of the sieve conduit may be configured with substantially any appropriate cross-sectional contour, such as but not limited to, regular polygons and closed curves. Furthermore, the cross-section may vary along the length of the elements.

It will be readily appreciated that the surface area of a cylindrical sieve is equal to its length times its circumference (diameter of the cylinder times pi). Therefore, a sieve whose length and diameter are equal to the diameter of the pipeline has a surface area that is about 300 percent of the cross-sectional area of the pipeline, and a sieve whose length is twice its diameter has a surface area that is about 800 percent of the cross-sectional area of the pipeline. Typically, the surface area of the sieve conduit is about 500 percent of the cross-sectional area of the pipeline, with about 45 percent of the surface area of the sieve conduit being open to allow fluid to flow through the sieve conduit.

Preferably, the sieve conduit is configured from substantially any suitable material, such as, but not limited to, stainless steel, carbon steel, steel metal, polymers, and plastics. The sieve conduit is configured with fluid flow openings smaller than the diameter of the cleaning balls being used in the system.

Referring now to the drawings, FIGS. 1–6 illustrate a first preferred embodiment of a ball trap 2 of the present invention and are therefore similarly numbered. As mentioned above, the first pipe section 4 includes an upstream opening 6 that is configured with a flange 6a for attachment to the pipeline (not shown), and a downstream opening 8 that is also configured with a flange 8a for attachment to the pipeline. Extending at an angle from the first pipe section 4 is the trap section 10 that terminates at a pipe end-cap 12, which is configured with a cleaning ball outlet 14. The sieve conduit 20 is deployed within the first pipe section 4 and the trap section 10 so as to extend from the upstream opening 6 to the pipe end-cap 12, including that area of the pipe end-cap 12 in which the cleaning ball outlet 14 is located.

Figure 2:
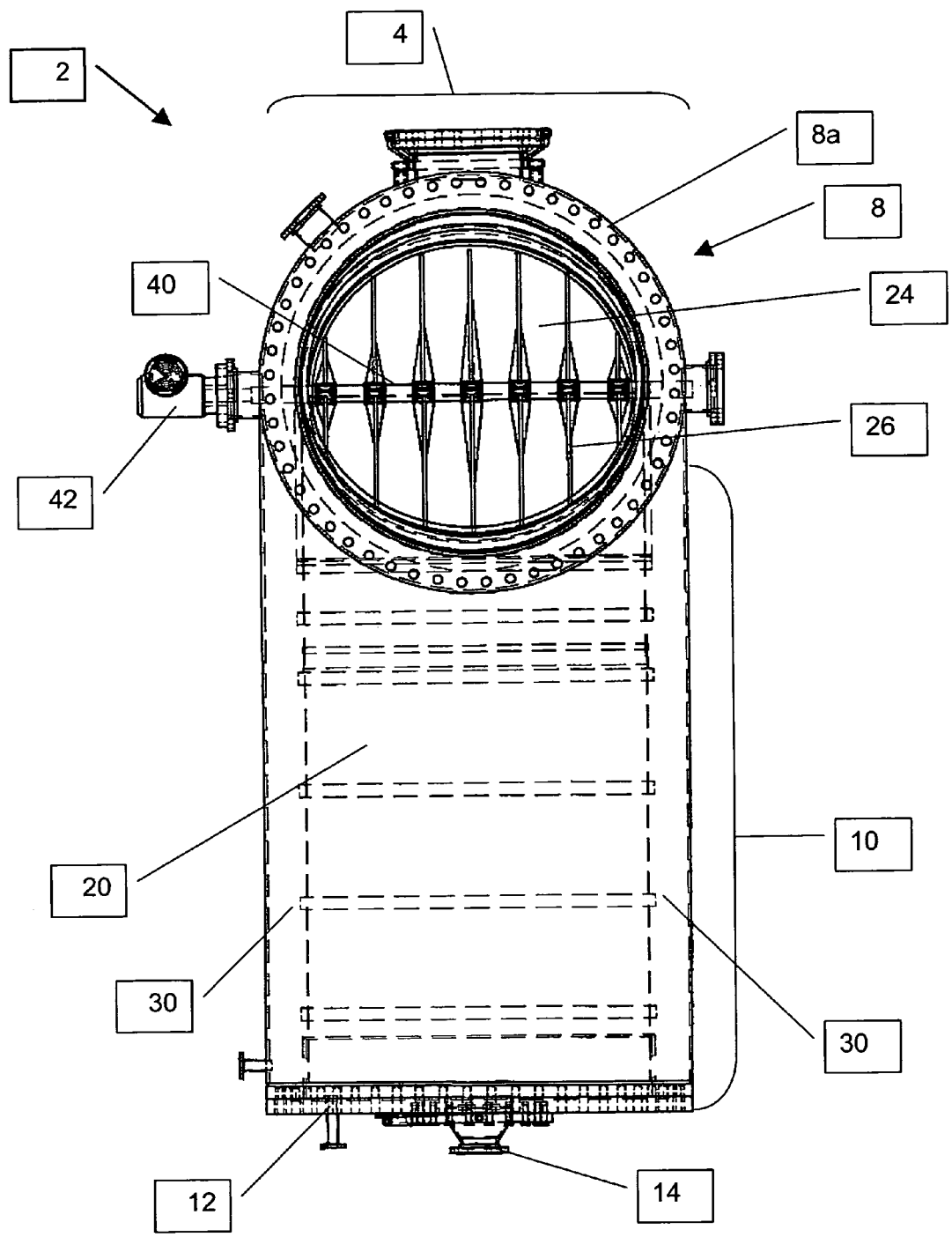
FIG. 2 is a schematic front view of the embodiment of FIG. 1, showing the rotatable sieve gate in a closed position.

By non-limiting example, a substantially circular sieve gate 22 is configured in the downstream region of that portion of the sieve conduit 20 deployed in the first pipe section 4. Regarding the sieve gate, the sieve material 24 is supported by reinforcing bars 26 such that the sieve material 24 is deployed on the upstream side of the reinforcing bars 26. The sieve gate 22 is illustrated in FIGS. 1 and 2 in a closed position for trapping cleaning balls entrained in the fluid flowing through the pipeline. The non-limiting example of the closed position illustrated here is at an angle of about 70 degrees to the direction of the main fluid flow path through the ball trap. The illustrations herein show the sieve gate rotatable through a 320 degree range of angles. With the sieve gate in the closed position, cleaning balls entering the sieve conduit 20 through the upstream opening 6 are deflected into the portion of the sieve conduit 20 located in the trap section 10 for removal through the cleaning ball outlet 14. As mentioned above, the cleaning ball outlet may or may not be associated with a valve for controlling the flow of the cleaning balls and some of fluid through the cleaning ball outlet 14, and such flow may be controlled at intervals or on a continual basis. However, removal of the cleaning balls may be by substantially any known means, and is therefore not the concern of this application. The fluid passes through the sieve conduit 20, including the sieve gate 22, into the region 30 between the sieve conduit 20 and the walls of each of the first pipe section 4 and the trap section 10, and out of the ball trap 2 through the downstream opening 8. It should be noted that the inside diameter of the sieve conduit 20 is preferably equal to the inside diameter of the pipeline, therefore, the first pipe section 4 and the trap section 10 of the ball trap preferably have inside diameters that are larger than that of the pipeline so as to accommodate the sieve conduit 20. Therefore, flow impedance encountered by the fluid as it flows through the sieve conduit 20 is reduced by providing the alternative flow path through the sieve conduit in the trap section of the ball trap.

Figure 3:
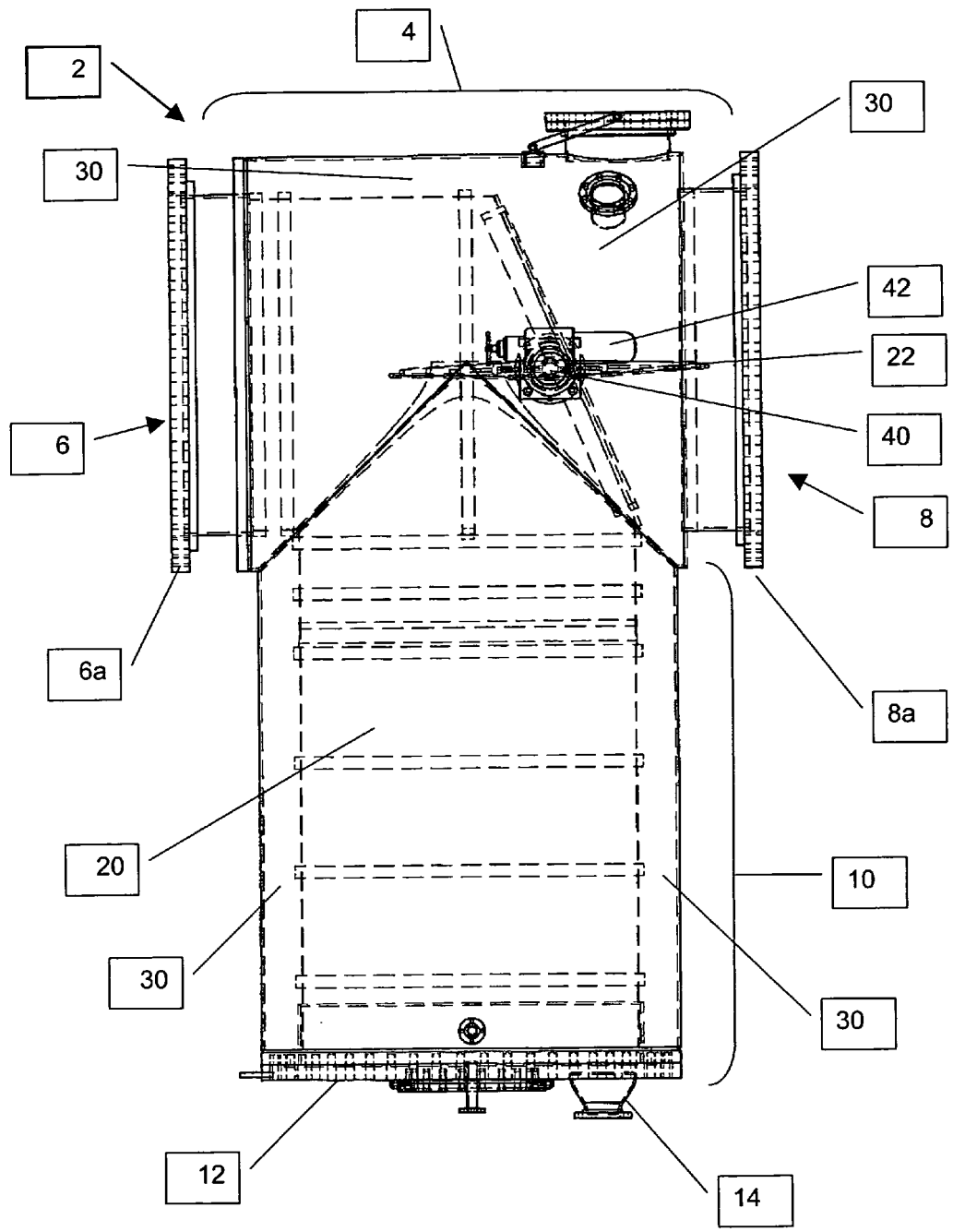
FIG. 3 is a schematic side view of the embodiment of FIG. 1, showing the sieve gate rotated to a fully open position.
Figure 4:
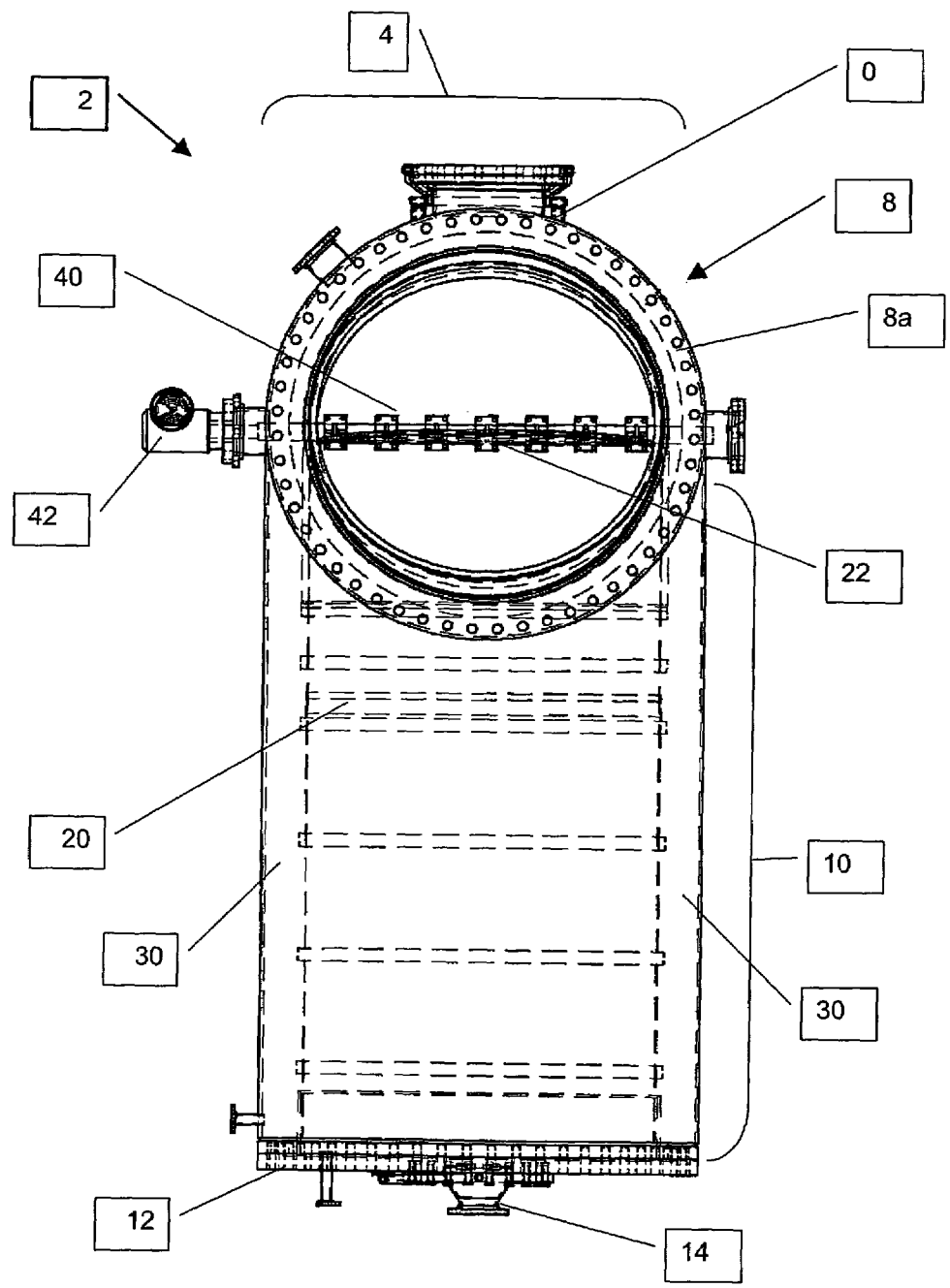
FIG. 4 is a schematic front view of the embodiment of FIG. 1, showing the sieve gate rotated to a fully open position.

The sieve gate 22 illustrated here is mounted on an axle 40 that is rotated by a motor and gear assembly 42. Fluid pressure is monitored on both the upstream and downstream sides of the sieve 20, and rotation of the sieve gate 22 is affected when a predetermined pressure differential is reached, at which time the sieve gate 22 will open thereby lowering the flow impedance to the fluid flow through the pipeline. FIGS. 3 and 4, illustrate the sieve gate 22 after a counter clockwise rotation of about 75 degrees so as to lie in a plane substantially parallel to the direction of the main fluid flow path through the ball trap 2.

Figure 5:
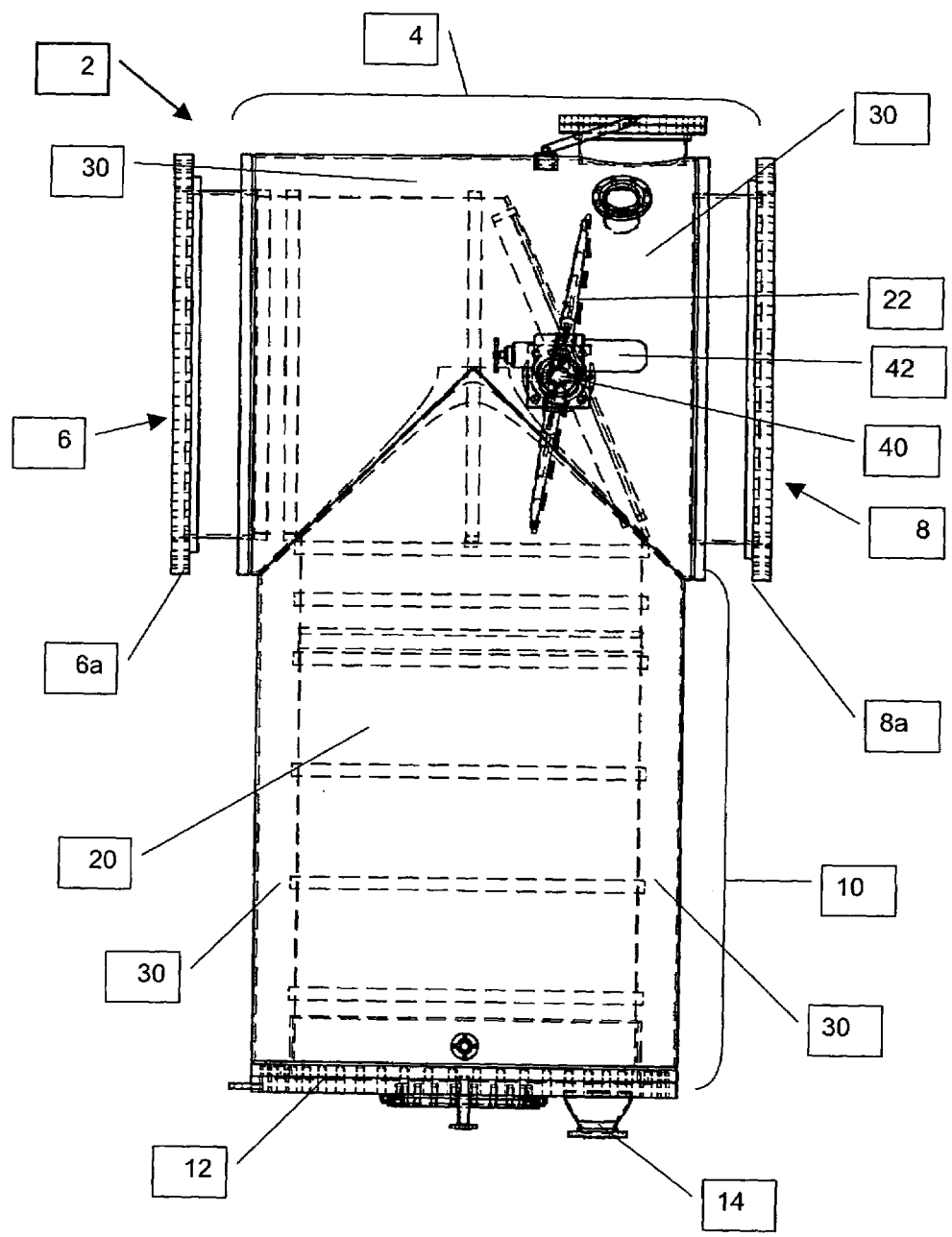
FIG. 5 is a schematic side view of the embodiment of FIG. 1, showing the sieve gate rotated to a backwash cleaning position.

The sieve gate 22 may also be rotated on demand for backwash cleaning, or other servicing requirements. FIG. 5 illustrates the sieve gate 22 after a counter clockwise rotation of about 160 degrees such that the sieve material 24 is now downstream of the reinforcing bars 26. In such a rotational deployment, the normally upstream surface of the sieve gate 22 is now the downstream surface and any foulant buildup is washed away by the force of the fluid flowing through the sieve gate 22.

Figure 6:
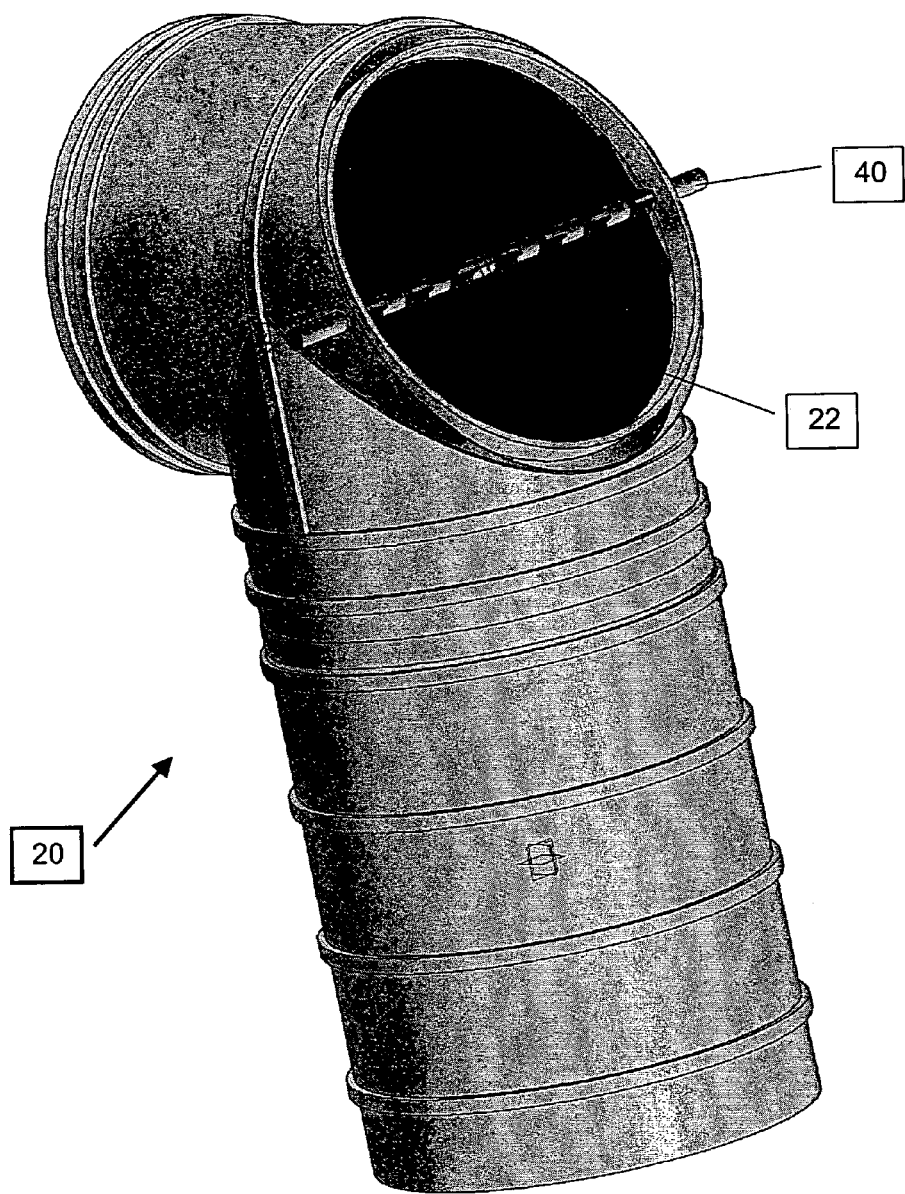
FIG. 6 is an isometric view of the sieve conduit of the embodiment of FIG. 1, showing the rotatable sieve gate in a closed position.

FIG. 6 illustrates the sieve conduit without the enclosing pipe sections.

Figure 7:
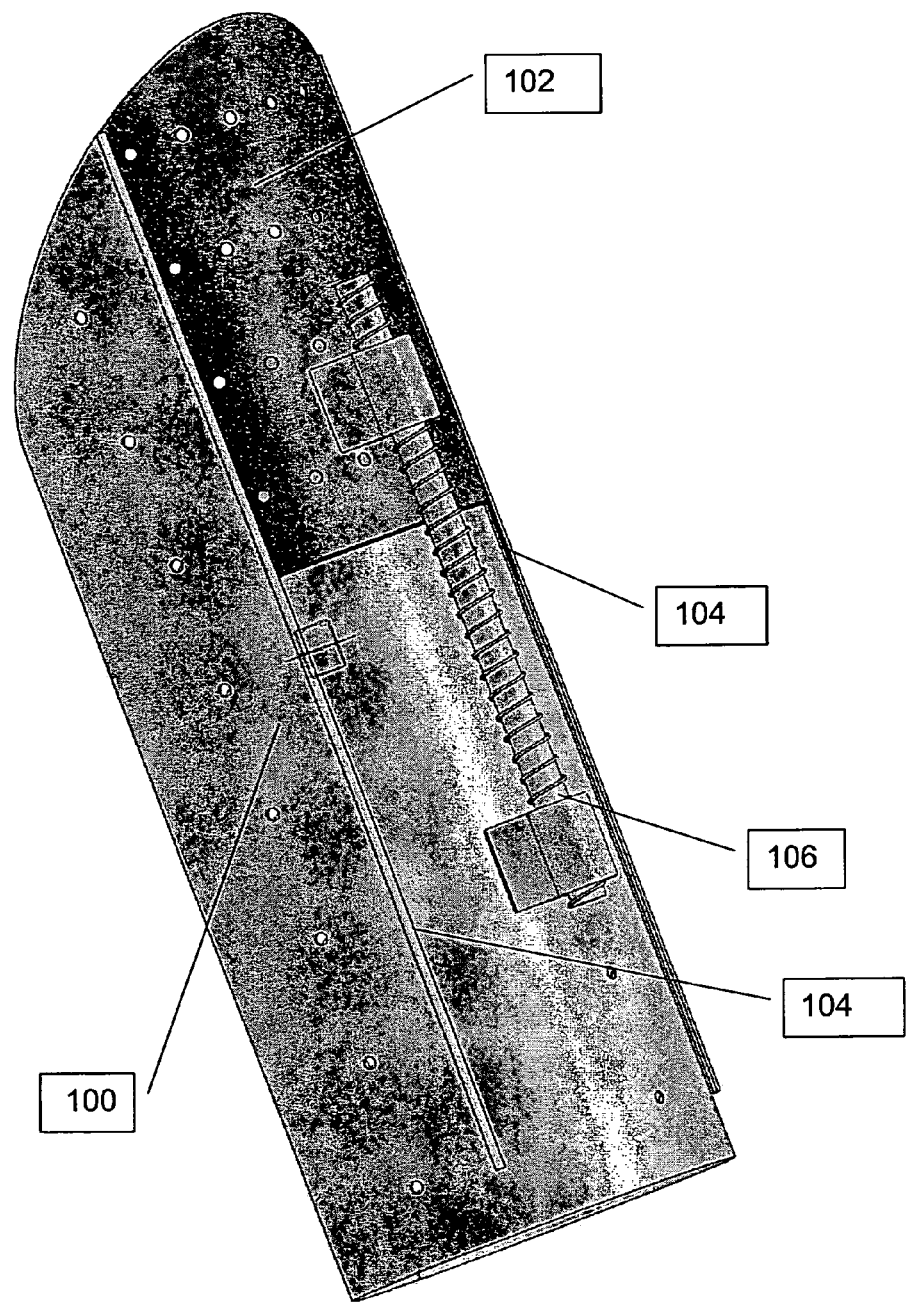
FIG. 7 is an isometric view of the sieve conduit of a second preferred embodiment of a ball trap constructed and operative according to the teachings of the present invention, showing the slideable sieve gate in a closed position.
Figure 8:
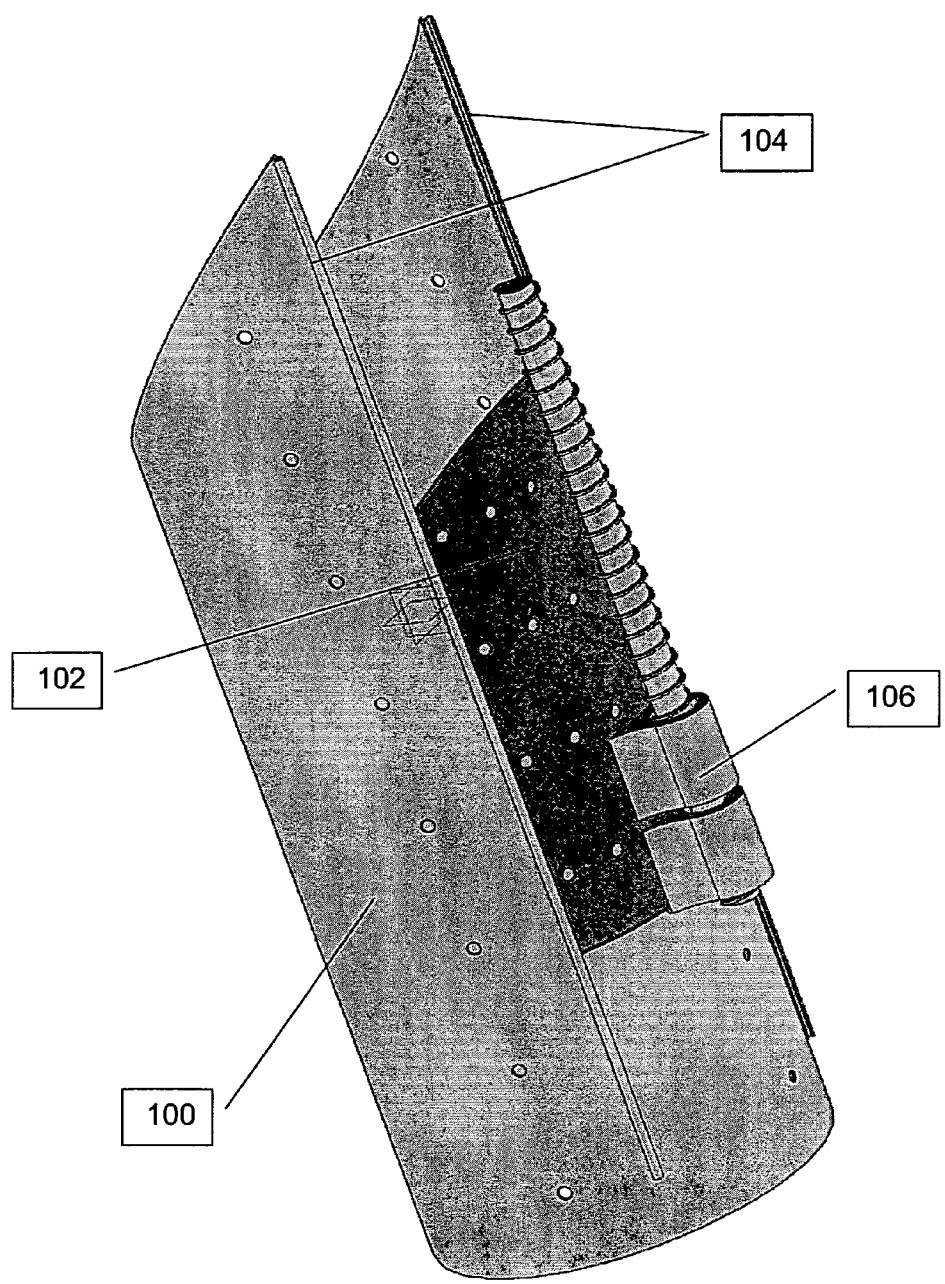
FIG. 8 is an isometric view of the sieve conduit of FIG. 7, showing the slideable sieve gate in an open position.
Figure 9:
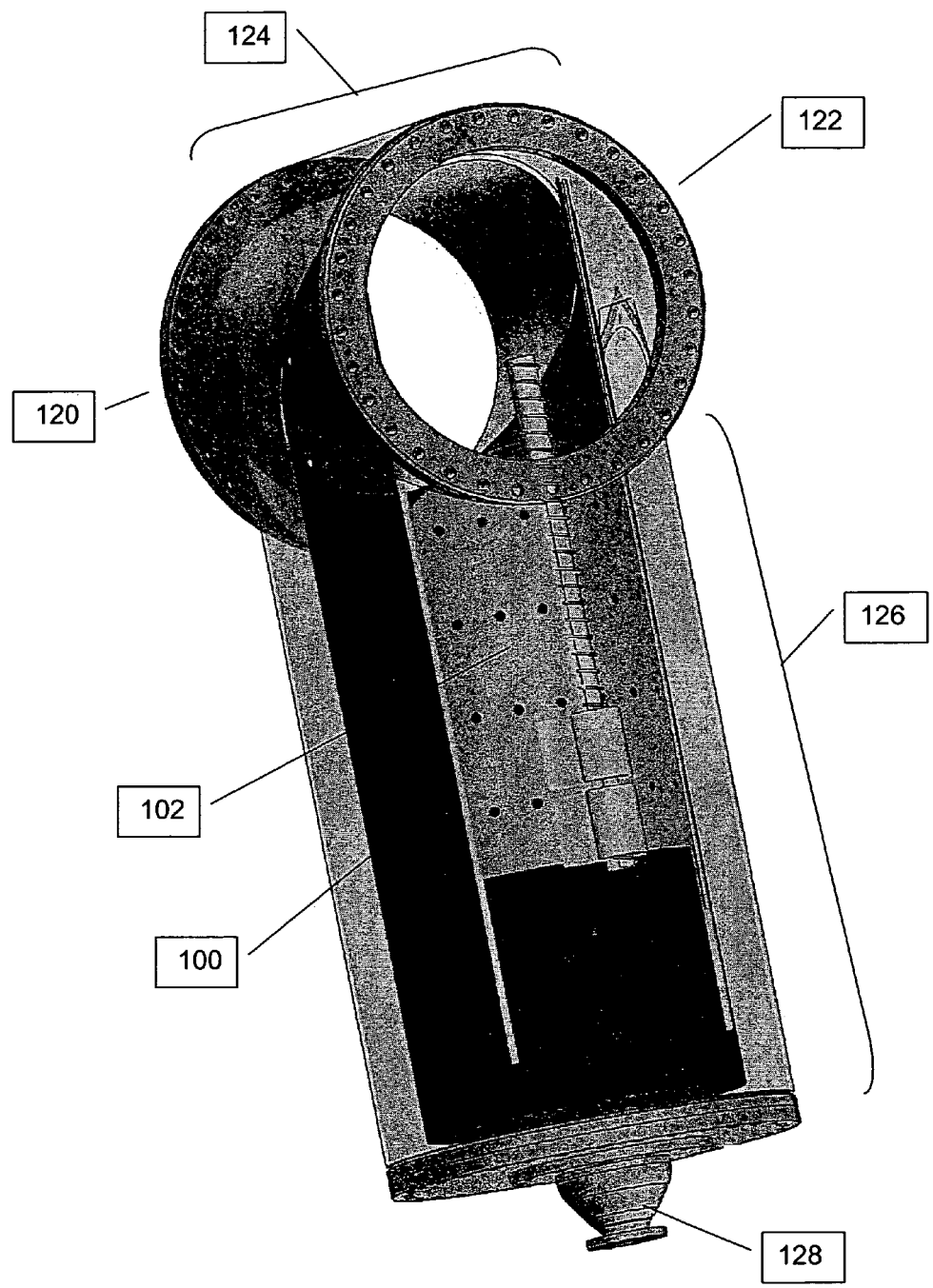
FIG. 9 is an isometric view of a second preferred embodiment of a ball trap configured with the sieve conduit of FIG. 7, with the slideable sieve gate shown in an open position.

A second preferred embodiment of the ball trap of the present invention is illustrated in FIGS. 7–9. FIGS. 7 and 8 show the portion of the sieve conduit 100 on which the sieve gate 102 is deployed. In this embodiment, the sieve gate 102 is displaced substantially linearly along tracks 104 by turning the screw mechanism 106. It will be appreciated that there are numerous mechanisms capable of displacing the sieve gate 102 along a linear path between the closed position of FIG. 7 and the open position of FIG. 8, and that the screw mechanism shown here is a non-limiting example. In this embodiment too, the displacement of the sieve gate 102 is responsive to a predetermined pressure differential upstream and downstream of the sieve conduit 100.

FIG. 9 illustrates the sieve conduit 100 deployed within a first pipe section 124 that has an upstream opening 120 and a downstream opening 122, and a trap section 126 that extends at an angle from the first pipe section 124 and includes and cleaning ball outlet 128. As was discussed with regard to the first preferred embodiment of the present invention, the cleaning balls are trapped in the sieve conduit 100 while the fluid flowing through the pipeline passes through the sieve conduit 100 into the region between the sieve conduit 100 and the walls of the ball trap pipe sections 124 and 126, and exits the ball trap trough the downstream opening 122.

It will be appreciated that the above descriptions are intended only to serve as examples and that many other embodiments are possible within the spirit and the scope of the present invention.

What is claimed is:

1. A ball trap for separating a plurality of cleaning balls from a fluid within which they are carried through at least part of a pipeline, the ball trap comprising:
    (a) a cylindrical pipe section provided with upstream and downstream openings for interconnection with the pipeline such that a main fluid flow path of the pipeline passes through said upstream and said downstream openings;
    (b) a trap section interconnected to, and having a length extending at an angle from, said cylindrical pipe section, said interconnection providing fluid communication between said cylindrical pipe section and said trap section, said trap section including a cleaning ball outlet;
    (c) a sieve conduit having a portion extending substantially lengthwise within said trap section, said sieve conduit connecting between said upstream opening and said cleaning ball outlet for trapping the plurality of cleaning balls therein as fluid continually flows from said upstream opening to said downstream opening, said sieve conduit having a safety-release opening positioned for substantially straight-through flow from said upstream opening to said downstream opening, said sieve conduit configured so as to provide a fluid flow region between at least one wall of said sieve conduit and at least one wall of said trap section so as to provide a fluid return path to said downstream opening; and
    (d) a displaceable sieve gate configured in said sieve conduit, said sieve gate displaceable between a closed position in which said sieve gate closes said safety-release opening to passage of the cleaning balls such that the plurality of cleaning balls are trapped within said sieve conduit and generally directed toward said cleaning ball outlet, and an open position in which said safety-release opening is at least partially opened such that the impedance of the fluid flow in the pipeline is lowered.

2. The ball trap of claim 1, wherein said sieve conduit has a surface area greater than 300% of a cross-sectional area of the pipeline.

3. The ball trap of claim 1, wherein said trap section is configured as a cylindrical trap section.

4. The ball trap of claim 3, wherein said portion of said sieve conduit extending along a length of said trap section is configured as a generally cylindrical sieve conduit portion.

5. The ball trap of claim 1, wherein said sieve conduit is configured so as to extend from said upstream opening in a first direction through at least a portion of said cylindrical pipe section, and extends in a second direction through at least a portion of said trap section.

6. The ball trap of claim 5, wherein said displaceable sieve gate is configured in a portion of said sieve extending through said cylindrical pipe section.

7. The ball trap of claim 6, wherein said displaceable sieve gate is configured in a downstream end of said portion of said sieve extending through said cylindrical pipe section.

8. The ball trap of claim 1, wherein said displaceable sieve gate is rotationally displaceable about an axis that passes through a center point of the pipeline.

9. The ball trap of claim 8, wherein said axis is substantially perpendicular to both a direction of said main fluid flow path and a length of said trap section.

10. The ball trap of claim 1, wherein said displaceable sieve gate is linearly displaceable.

11. The ball trap of claim 1, further including a sieve gate displacement mechanism configured to selectively displace said sieve gate between said closed position and said open position.

12. The ball trap of claim 11, wherein said sieve gate displacement mechanism is configured so as to displace said sieve gate automatically in response to a predetermined pressure differential between upstream and downstream sides of said sieve.

13. The ball trap of claim 11, wherein said sieve gate displacement mechanism is configured so as to displace said sieve gate into a backwash deployment such that fluid flowing in said direction of said main fluid flow path passes through said sieve gate in a substantially reverse direction.

14. A method for separating a plurality of cleaning balls circulating in a fluid through a pipeline, the method comprising:
   (a) providing a cylindrical pipe section provided with upstream and downstream openings for interconnection with the pipeline such that a main fluid flow path of the pipeline passes through said upstream and said downstream openings;
   (b) providing a trap section interconnected to, and having a length extending at an angle from, said cylindrical pipe section, said interconnection providing fluid communication between said cylindrical pipe section and said trap section, said trap section including a cleaning ball outlet;
   (c) providing a sieve conduit having a portion extending substantially lengthwise within said trap section, said sieve conduit connecting between said upstream opening and said cleaning ball outlet for trapping the plurality of cleaning balls therein as fluid continually flows from said upstream opening to said downstream opening, said sieve conduit having a safety-release opening positioned for substantially straight-through flow from said upstream opening to said downstream opening, said sieve conduit configured so as to provide a fluid flow region between at least one wall of said sieve conduit and at least one wall of said trap section so as to provide a fluid return path to said downstream opening;
   (d) providing a displaceable sieve gate configured in said sieve conduit, said sieve gate displaceable between a closed position in which said sieve gate closes said safety-release opening to passage of the cleaning balls such that the plurality of cleaning balls are trapped within said sieve conduit and generally directed toward said cleaning ball outlet, and an open position in which said safety-release opening is at least partially opened such that the impedance of the fluid flow in the pipeline is lowered; and
   (e) trapping the plurality of cleaning balls in said sieve conduit as fluid continually flows from said upstream opening to said downstream opening.

15. The method of claim 14, wherein said sieve conduit is implemented with a surface area greater than 300% of a cross-sectional area of the pipeline.

16. The method of claim 14, wherein said trap section is implemented as a cylindrical trap section.

17. The method of claim 16, wherein said portion of said sieve conduit extending along a length of said trap section is implemented as a generally cylindrical sieve conduit portion.

18. The method of claim 14, wherein said sieve is implemented so as to extend from said upstream opening in a first direction through at least a portion of said cylindrical pipe section, and extends in a second direction through at least a portion of said trap section.

19. The method of claim 18, wherein said displaceable sieve gate is implemented in a portion of said sieve extending through said cylindrical pipe section.

20. The method of claim 19, wherein said displaceable sieve gate is implemented in a downstream end of said portion of said sieve extending through said cylindrical pipe section.

21. The method of claim 14, wherein said displaceable sieve gate is implemented so as to be displaceable about an axis that passes through a center point of the pipeline.

22. The method of claim 21, wherein said axis is implemented so as to be substantially perpendicular to both a direction of said main fluid flow path and a length of said trap section.

23. The method of claim 14, wherein said displaceable sieve gate is implemented so as to be linearly displaceable.

24. The method of claim 14, further including displacing said sieve gate between said closed position and said open position by use of a sieve gate displacement mechanism.

25. The method of claim 24, wherein said sieve gate displacement mechanism is implemented so as to displace said sieve gate automatically in response to a predetermined pressure differential between upstream and downstream sides of said sieve.

26. The method of claim 24, wherein said sieve gate displacement mechanism is implemented so as to displace said sieve gate into a backwash deployment such that fluid flowing in said direction of said main fluid flow path passes through said sieve gate in a substantially reverse direction.

* * * * *